(12) United States Patent
Zhu et al.

(10) Patent No.: US 12,231,805 B2
(45) Date of Patent: Feb. 18, 2025

(54) DISPLAY MODULE SET AND DISPLAY SCREEN

(71) Applicants: NANJING LOPU CO., LTD., Jiangsu (CN); NANJING LOPU TECHNOLOGY CO., LTD., Jiangsu (CN)

(72) Inventors: Bin Zhu, Jiangsu (CN); Deyu Han, Jiangsu (CN); Sheng Li, Jiangsu (CN); Ning Xu, Jiangsu (CN); Xiuwei Lv, Jiangsu (CN); Chengbing Guo, Jiangsu (CN); Lingling Jiang, Jiangsu (CN); Yezhuang Xu, Jiangsu (CN)

(73) Assignees: NANJING LOPU CO., LTD., Jiangsu (CN); NANJING LOPU TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/025,725

(22) PCT Filed: Nov. 29, 2022

(86) PCT No.: PCT/CN2022/134989
§ 371 (c)(1),
(2) Date: Mar. 10, 2023

(87) PCT Pub. No.: WO2024/016545
PCT Pub. Date: Jan. 25, 2024

(65) Prior Publication Data
US 2024/0291940 A1  Aug. 29, 2024

(30) Foreign Application Priority Data
Jul. 18, 2022 (CN) .......................... 202221833351.7

(51) Int. Cl.
*H04N 5/64* (2006.01)
*G09G 3/32* (2016.01)

(52) U.S. Cl.
CPC ............... *H04N 5/642* (2013.01); *G09G 3/32* (2013.01); *G09G 2300/026* (2013.01)

(58) Field of Classification Search
CPC ..... H04N 5/642; G09G 3/32; G09G 2300/026
See application file for complete search history.

(56) References Cited

U.S. PATENT DOCUMENTS

2013/0192055 A1\* 8/2013 Sasaki ............... G02F 1/133308
29/592.1
2017/0112009 A1\* 4/2017 Hall ........................ G06F 1/189
(Continued)

FOREIGN PATENT DOCUMENTS

CN 108230938 A 6/2018
CN 209328433 U 8/2019
(Continued)

OTHER PUBLICATIONS

International Search Report for PCT Application No. PCT/CN2022/134989, mailed on Apr. 13, 2023, and its English translation, 13 pages.

(Continued)

*Primary Examiner* — Tracy Y. Li
(74) *Attorney, Agent, or Firm* — Bret E. Field; Bozicevic, Field & Francis LLP (57) ABSTRACT

The present disclosure relates to the technical field of display screen, and provides a display module set and a display screen. The display module set comprises a cabinet frame and a plurality of display modules. The cabinet frame comprises a power box and a plurality of sub-frames located on the left and right sides of the power box. The sub-frames on each side are arranged sequentially in a vertical direction.

(Continued)

The plurality of the display modules corresponds to a plurality of the sub-frames on a one-to-one basis. A drive circuit and mounting members of the display module are both provided on a left side and/or right side region. A middle region of the display module is uniformly distributed with a hole structure for sound transmission. The display module is mounted on a corresponding sub-frame via the mounting members of the left side and/or right side region.

9 Claims, 9 Drawing Sheets

(56) References Cited

U.S. PATENT DOCUMENTS

| | | | |
|---|---|---|---|
| 2020/0241592 A1* | 7/2020 | Yoon | H04R 1/406 |
| 2021/0050486 A1* | 2/2021 | Li | G09G 3/14 |
| 2022/0046349 A1* | 2/2022 | Kim | H04R 1/028 |
| 2022/0223576 A1* | 7/2022 | Oh | H01L 25/162 |

FOREIGN PATENT DOCUMENTS

| | | | | |
|---|---|---|---|---|
| CN | 105392036 B | * | 10/2019 | ............. G06F 3/017 |
| CN | 210516019 U | | 5/2020 | |
| CN | 214428282 U | | 10/2021 | |
| CN | 214428283 U | | 10/2021 | |
| CN | 215599990 U | | 1/2022 | |
| CN | 216287381 U | | 4/2022 | |
| CN | 217386607 U | | 9/2022 | |
| JP | 2016110489 A | * | 6/2016 | |
| WO | WO2008147073 A1 | | 12/2008 | |

OTHER PUBLICATIONS

Extended European Search Report for corresponding European Patent Application No. 22868456.9, mailed on Apr. 4, 2024, 4 pages.

Office Action for corresponding European Patent Application No. 22868456.9, mailed on Apr. 16, 2024, 41 pages.

* cited by examiner

DISPLAY MODULE SET AND DISPLAY SCREEN

FIELD OF TECHNOLOGY

The present disclosure relates to the technical field of display screens, in particular to a display module set and a display screen.

BACKGROUND

Up till now, development of LED display screen has gradually been mature, and update of product has been slowed down. LED display screen companies are actively exploring new markets to expand the range of applications and scale of market. The film market is one of the directions of development.

At present, it is required that the sound be synchronized with the video for the equipment entering commercial cinema lines and playing commercial movies, and the play and processing of the cinema audio is as important as the screen display. For a display screen with loudspeakers provided at the edge of the screen, it is clearly not possible to achieve a large size due to the lack of sound in the middle position.

In order to achieve sound transmission in the middle position of a display screen, a solution of providing sound transmission holes on a display panel is proposed in some current technical solutions. For example, the patent document with publication number CN 216287381U discloses a display screen module, wherein sound-penetrable holes are provided on the light board. However, the light board is constructed by placing a control chip in the central region of the light board, and the edge region of the light board is provided with a magnetic attraction region, which makes the distribution of the sound transmission holes on the whole light board uneven. Moreover, the control chip region and the magnetic attraction region occupy a certain space respectively, which reduces the area of the region where the sound transmission holes can be provided, thus significantly affecting the sound transmission effect. In addition, the control chip is concentrated in the central region, and the heat generated by the control chip is not easily dissipated, which may cause a problem that the color coordinate of the light-emitting tube is shifted due to the increase of the heat, thereby seriously affecting the display effect.

SUMMARY

In order to solve the above-mentioned technical problem, the present disclosure provides a display module set and a display screen, which can enlarge the sound transmission area and improve the sound transmission effect, are suitable for splicing into a large-sized display screen, and can improve the heat dissipation performance.

The technical solutions adopted by the present disclosure are as follows:

A display module set, comprising: a cabinet frame, wherein the cabinet frame comprises a power box and a plurality of sub-frames located on the left and right sides of the power box, and the sub-frames on each side are arranged sequentially in a vertical direction; a plurality of display modules, wherein the plurality of the display modules corresponds to a plurality of the sub-frames on a one-to-one basis, a drive circuit and mounting members of the display module are both provided on a left and/or right side region, a middle region of the display module is uniformly distributed with a hole structure for sound transmission, and the display module is mounted on a corresponding sub-frame via the mounting members of the left side and/or right side region.

The power box comprises a body and a rear cover, and an anti-theft lock and a first micro-switch are fitted between the rear cover and the body.

Both upper side and lower side of the body are provided with cable holes.

The display module comprises a PCB board, a mask provided on a light-emitting surface of the PCB board and a metal plate provided on a drive surface of the PCB board, wherein all the light-emitting surface of the PCB board is provided with light-emitting pixels arranged in an array; first sound transmission holes are provided between every four adjacent light-emitting pixels in a middle region of the light-emitting surface of the PCB board; the drive circuit for driving the light-emitting pixels, the mounting members for fixedly mounting the metal plate and fixedly mounting the sub-frame, a second micro-switch and a third micro-switch are provided on a left side and/or right side region of the drive surface of the PCB board; a switch through-hole is provided in the left side and/or right side region of the metal plate at a position corresponding to the third micro-switch, a mounting member through-hole is provided at a position corresponding to the mounting member for fixedly mounting the sub-frame, and second sound transmission holes are provided in the middle region of the metal plate; the middle region of the mask is provided with third sound transmission holes, and the third sound transmission holes provided by the mask correspond to the first sound transmission holes provided by the PCB board.

The mask is secured to the PCB board by gluing.

The mask is made of an electromagnetic shielding material.

An insulating and vibration-absorbing material is filled between the metal plate and the PCB board.

A receiving space is also provided at the left side and/or right side region of the metal plate at positions corresponding to the protruding elements of the drive circuit.

The first sound transmission holes provided by the PCB board are metallized holes.

The cabinet frame is made of metal or embedded in a metal protective housing.

A display screen comprising at least one display module set as described above.

When the display screen is a movie screen formed by splicing a plurality of the display module sets, one of the display module sets is mounted with a cinema server, and the display module set mounted with the cinema server is provided at a corner of the movie screen.

Advantageous effects of the present disclosure are as follows.

The mounting positions of the drive circuit and the module in the display module of the present disclosure are two-in-one, and are in a side region. Therefore, the hole structure for sound transmission on the display module can be concentrated and uniformly provided in the middle position, so that the sound transmission region can be increased and the sound transmission effect can be improved, which is suitable for splicing into a large-sized display screen. Moreover, since the drive circuit is in a position in direct contact with the frame, heat conduction through the frame is facilitated, so that the heat dissipation performance can be improved.

LIST OF REFERENCE NUMERALS IN THE DRAWINGS

100 Cabinet frame
200 Display module
300 Cinema server
110 Power box
120 Sub-frame
210 PCB board
220 Mask
230 Metal plate
111 Body
112 Rear cover
113 Anti-theft lock
114 First micro-switch
115 Self-test switch
116 Cable hole
211 Light-emitting pixel
212 First sound transmission holes
213 Drive circuit
214 Mounting member
215 Second micro-switch
216 Third micro-switch
231 Switch through-hole
232 Mounting member through-hole

DESCRIPTION OF THE EMBODIMENTS

The technical solutions of the embodiments of the present disclosure will be clearly and completely described below with reference to the accompanying drawings of the embodiments of the present disclosure. It is obvious that the described embodiments are only a part of the embodiments of the present disclosure, rather than all the embodiments. Based on the embodiments in the present disclosure, all the other embodiments obtained by a person skilled in the art without involving any inventive effort fall within the scope of protection of the present disclosure.

Figure 1:
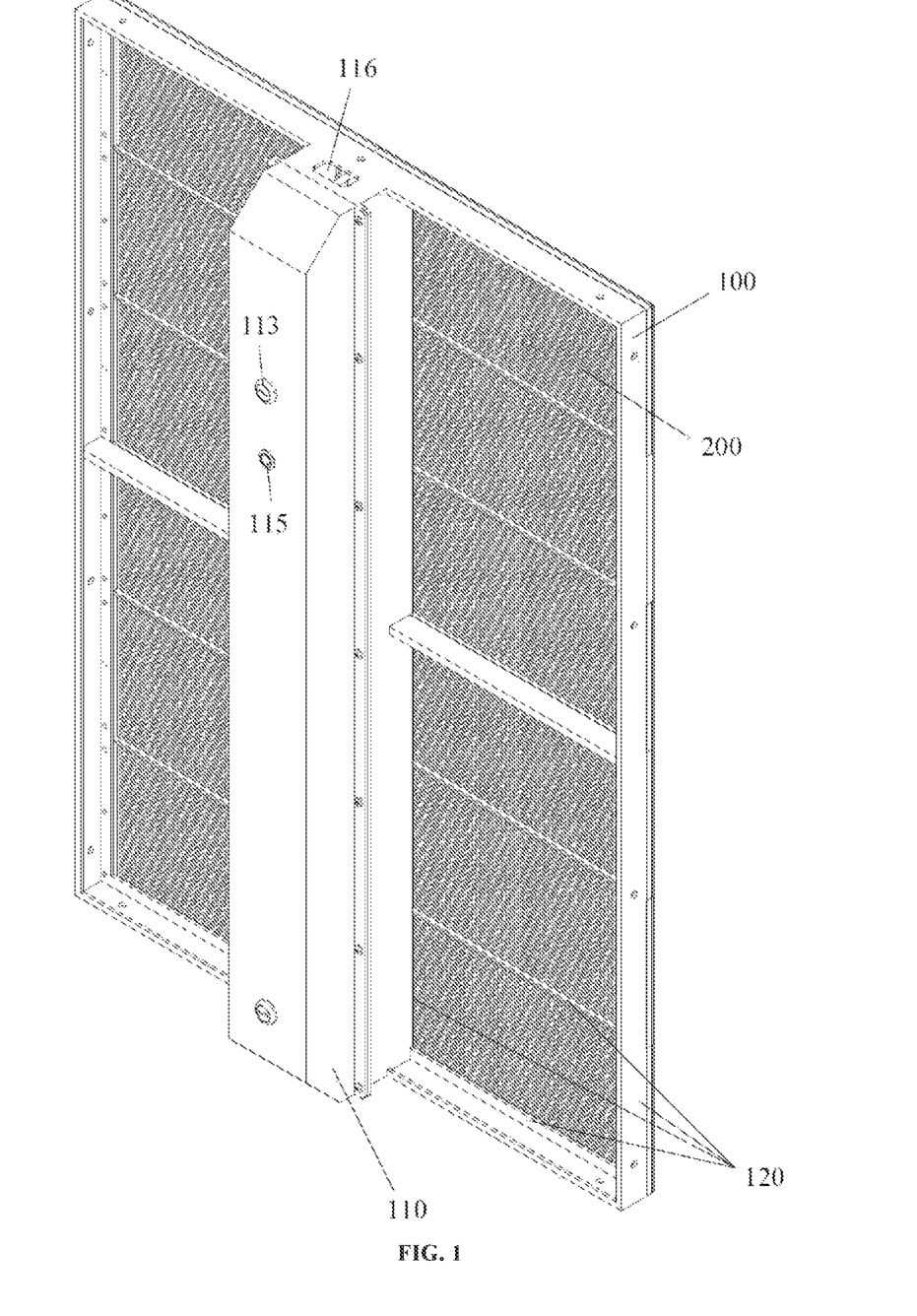
FIG. 1 is a structural diagram of one view of a display module set according to an embodiment of the present disclosure.
Figure 2:
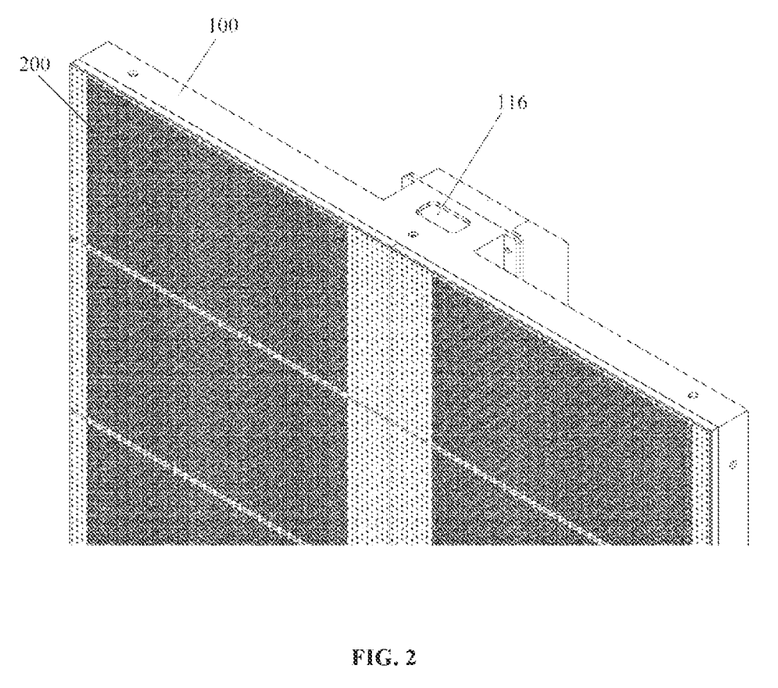
FIG. 2 is a partial structure diagram of another perspective of a display module set according to an embodiment of the present disclosure.

As shown in FIGS. 1 and 2, the display module set of the embodiment of the present disclosure comprises a cabinet frame 100 and a plurality of display modules 200, wherein the cabinet frame 100 comprises a power box 110 and a plurality of sub-frames 120 located on the left and right sides of the power box 110. The sub-frames 120 on each side are arranged sequentially in the vertical direction. A plurality of display modules 200 correspond to the plurality of sub-frames 120 on a one-to-one basis. A drive circuit and mounting members of the display module 200 are both provided on a left side and/or right side region. A middle region of the display module 200 is uniformly distributed with a hole structure for sound transmission. The display module 200 is mounted on a corresponding sub-frame 120 via the mounting members of the left side and/or right side region.

According to the display module set of the embodiment of the present disclosure, the mounting positions of the drive circuit and the module in the display module of the present disclosure are two-in-one, and are in a side region. Therefore, the hole structure for sound transmission on the display module can be concentrated and uniformly provided in the middle position, so that the sound transmission region can be increased and the sound transmission effect can be improved, which is suitable for splicing into a large-sized display screen. Moreover, since the drive circuit is in a position in direct contact with the frame, heat conduction through the frame is facilitated, so that the heat dissipation performance can be improved.

In an embodiment of the present disclosure, as shown in FIGS. 1, 2, 3 and 4, The power box 110 comprises a body 111 and a rear cover 112. The power box 110 can be provided with a power supply, a control board, a power line, a control line and a signal line, etc. of the whole display module set inside. An anti-theft lock 113 and a first micro-switch 114 can be fitted between the rear cover 112 and the body 111. By mounting the anti-theft lock 113, the rear cover 112 of the power box 110 is not easily opened by strangers, improving the anti-theft performance. The first micro-switch 114 may be mounted in the body 111, with its switch button being pressed by the rear cover 112 when the rear cover 112 is mounted in place. The first micro-switch 114 may be activated when the rear cover 112 is pried to release the pressing of its switch button. The first micro-switch 114 can be connected to a security monitoring circuit or a security execution circuit, and when it is triggered, a security prompt can be issued, i.e. a message that the power box 110 is accidentally opened is transmitted to the outside, or a security action can be executed. For example, in a movie screen application scenario, the cinema server can interrupt the playing of a movie when the first micro-switch 114 is triggered to prevent the data information of the movie screen from being stolen, resulting in the movie material being pirated.

Figure 3:
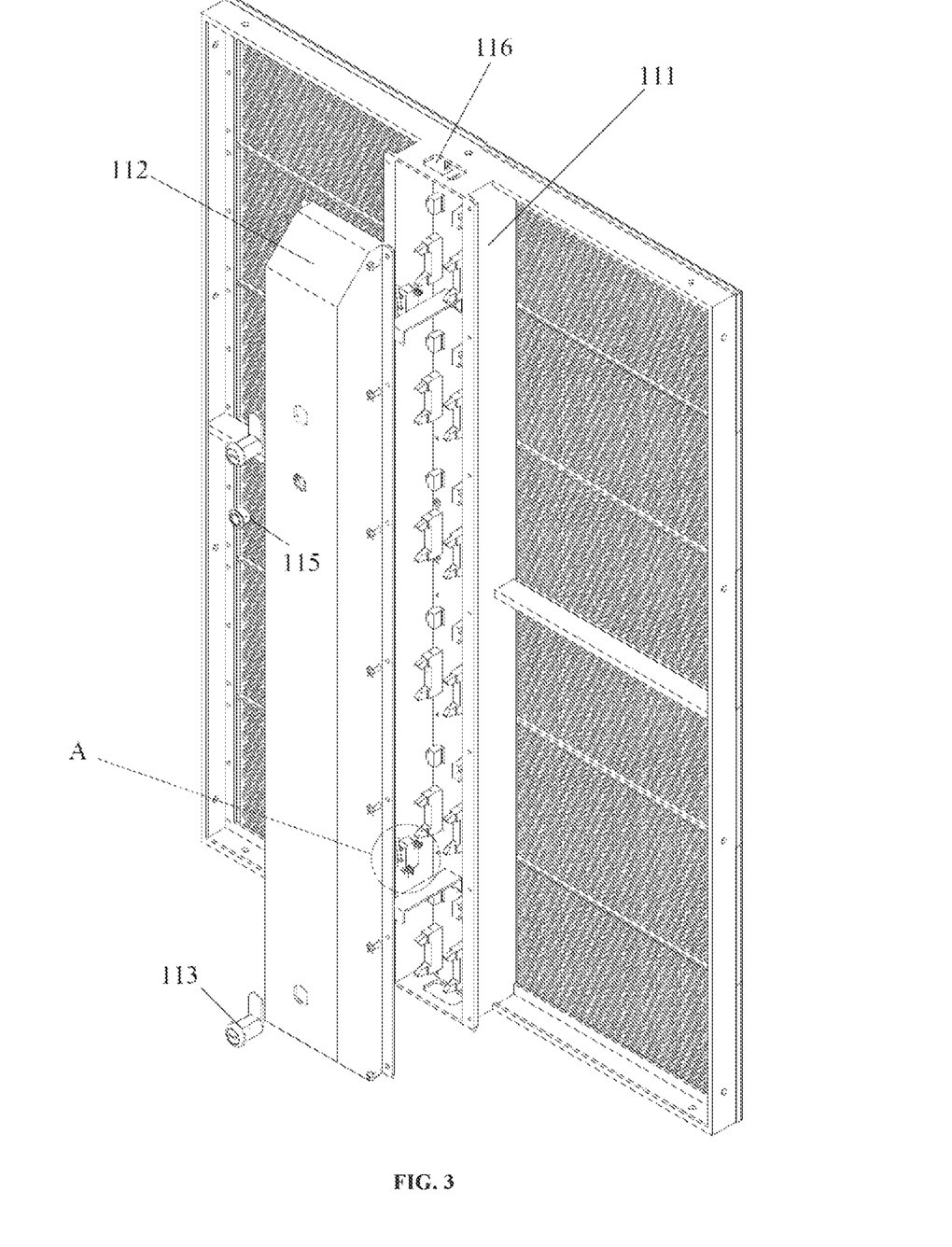
FIG. 3 is a structure diagram of one view of a display module set comprising a specific structure of a power box according to an embodiment of the present disclosure.
Figure 4:
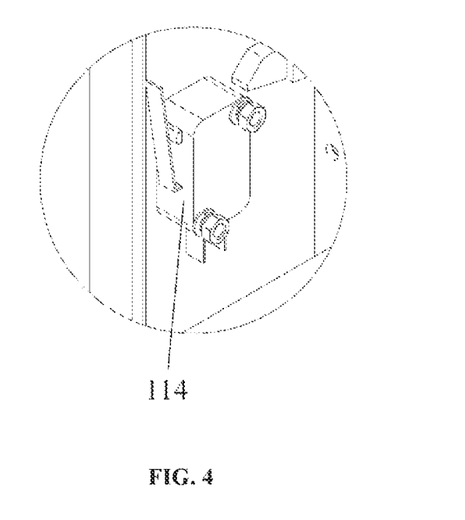
FIG. 4 is an enlarged view of a portion A in FIG. 3.

In addition, as shown in FIGS. 1 and 3, a self-test switch 115 can also be provided on the power box 110, and the self-test switch 115 is connected to a self-test circuit on a control board in the body 111. Since the power box 110 cannot be opened at will, by providing the self-test switch 115 which can be triggered after the display module set is powered on, whether the display module is normal can be detected.

As shown in FIGS. 1, 2 and 3, both the upper and lower sides of the body 111 are provided with cable holes 116 which can be used to pass through a cable such as a power line, a control line and a signal line when the display module set is spliced into a large display screen or when other electrical equipment and electrical elements are connected.

As shown in FIGS. 1, 2 and 3, the peripheral frames of the cabinet frame 100 form a plane which can be used as a splicing surface when splicing display module sets, so that adjacent display module sets are tightly joined.

Figure 5:
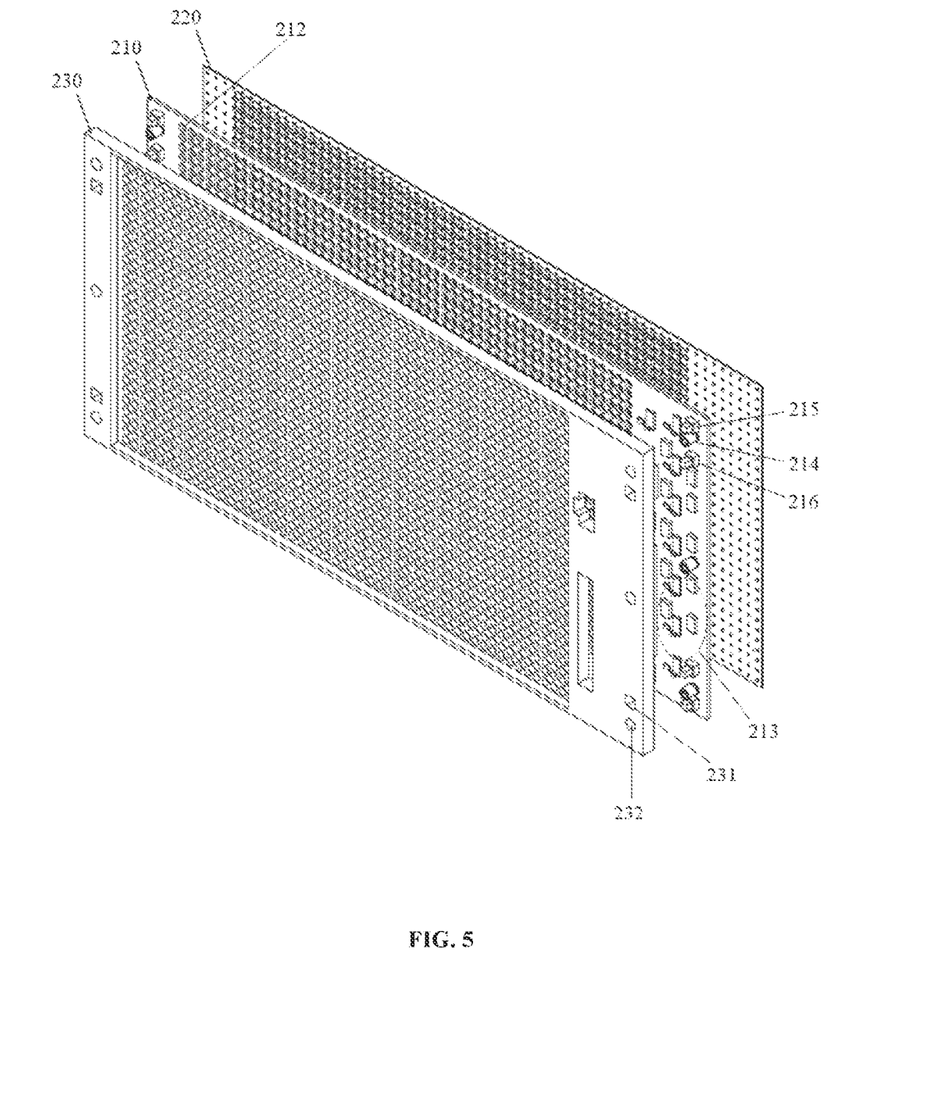
FIG. 5 is an exploded view of one view of a display module according to an embodiment of the present disclosure.
Figure 6:
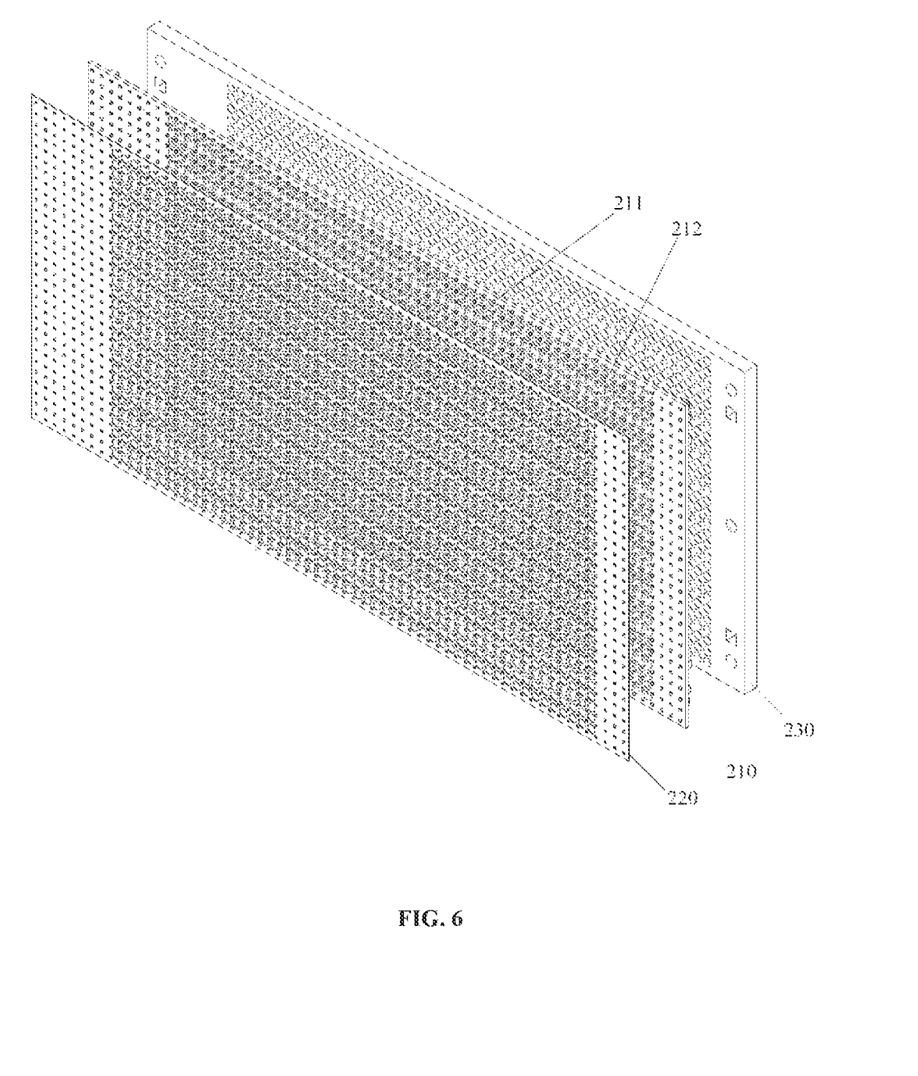
FIG. 6 is an exploded view from another perspective of the display module according to an embodiment of the present disclosure.

In an embodiment of the present disclosure, as shown in FIGS. 5 and 6, the display module 200 may include a PCB board 210, a mask 220 provided on a light-emitting surface of the PCB board 210, and a metal plate 230 provided on a drive surface of the PCB board 210. The whole light-emitting surface of the PCB board 210 is provided with light-emitting pixels 211 which are arranged in an array. First sound transmission holes 212 are provided between every four adjacent light-emitting pixels 211 in the middle region of the light-emitting surface of the PCB board 210. A drive circuit 213 for driving the light-emitting pixels 211, the mounting members 214 for fixedly mounting the metal plate 230 and fixedly mounting the sub-frame 120, a second micro-switch 215 and a third micro-switch 216 are provided on the left side and/or right side region of the drive surface of the PCB board 210 (only some elements of the drive circuit 213 are circled in FIG. 5). A switch through-hole 231 is provided in the left side and/or right side region of the metal plate 230 at a position corresponding to the third micro-switch 216, a mounting member through-hole 232 is provided at a position corresponding to the mounting member 214 for fixedly mounting the sub-frame 120, and second sound transmission holes are provided in a middle region of the metal plate 230. The middle region of the mask 220 is provided with third sound transmission holes, and the third sound transmission holes provided by the mask 220 correspond to the first sound transmission holes 212 provided by the PCB board 210.

Figure 7:
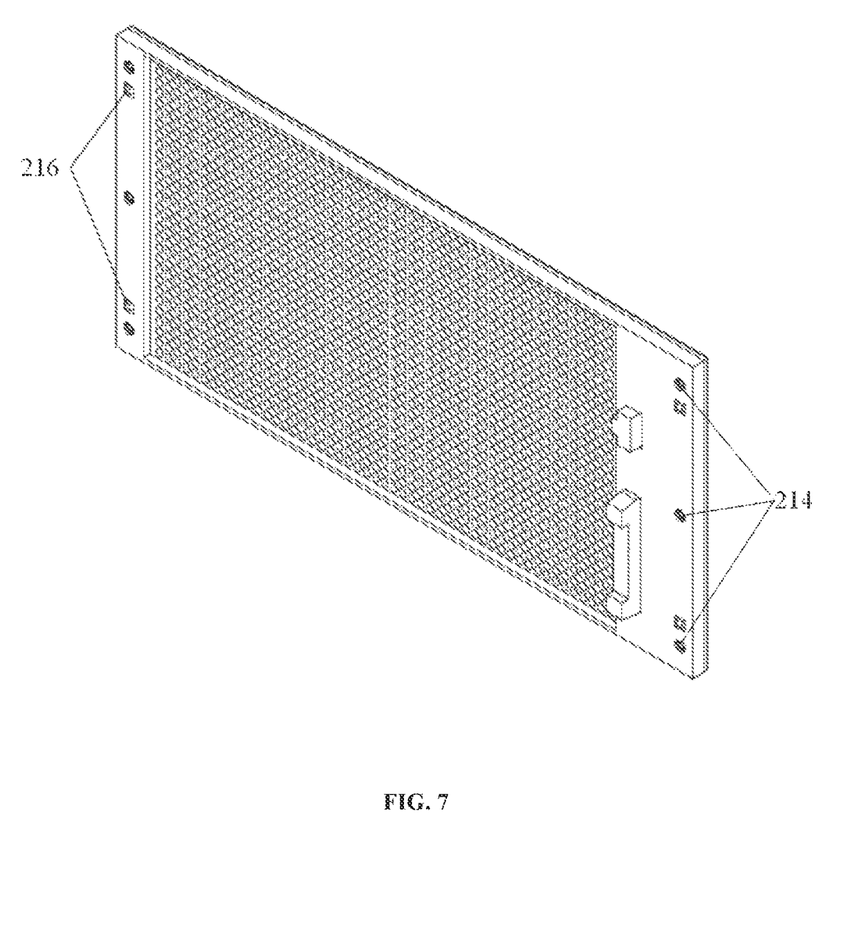
FIG. 7 is a structural diagram of one view of a display module according to an embodiment of the present disclosure.

It should be understood that the PCB board 210, the mask 220, and the metal plate 230 are mounted together by covering each other to form an integral display module plate, such as that shown in FIG. 7. Therefore, the shapes and areas of the three are the same, and the sizes of the middle regions, the left side and right side regions of the three are correspondingly the same.

In an embodiment of the present disclosure, the light-emitting pixels 211 can be LED light beads, and the first sound transmission holes 212 of the PCB board 210 can be circular. A main purpose of the mask 220 is to improve the display effect, and therefore the third sound transmission holes of the mask 220 need to correspond to the first sound transmission holes 212 of the PCB board 210 in aspects of the position, shape and size of the hole, in order to play its own role in improving the display effect and ensure that the sound transmission effect of the display module 200 is consistent with that without the mask 220. In addition, since the metal plate 230 is located on the back side of the PCB board 210, the size, shape and distribution of the second sound transmission holes thereof do not affect the vision, and therefore the second sound transmission holes of the metal plate 230 may be provided so as not to block the first sound transmission holes 212 of the PCB board 210 in the front-rear direction, so that sound can be smoothly transmitted through the first sound transmission holes 212 of the PCB board 210. Alternatively, the second sound transmission holes provided in the metal plate 230 correspond to the first sound transmission holes 212 provided in the PCB board 210.

On each PCB board 210, the drive circuit 213 can be provided on both the left side region and the right side region of the drive surface, and can also be provided on either of the left side region and the right side region of the drive surface. The mounting members 214 for fixedly mounting the metal plates 230 can be provided on both the left region and the right side region of the drive surface, and can also be provided on either of the left side region and the right side region of the drive surface. The mounting members 214 used for fixedly mounting the sub-frame 120 can be provided on both the left side region and the right side region of the drive surface, and can also be provided on either of the left side region and the right side region of the drive surface. The second micro-switch 215 can be provided on both the left side region and the right side region of the drive surface, and can also be provided on either of the left side region and the right side region of the drive surface. The third micro-switch 216 can be provided on both the left side region and the right side region of the drive surface, and can also be provided on either of the left side region and the right side region of the drive surface.

In an embodiment of the present disclosure, as shown in FIGS. 5, 6 and 7, the mask 220 covers the light-emitting surface of the PCB board 210, the metal plate 230 covers the drive surface of the PCB board 210. If the metal plate 230 being behind and the mask 220 being in front is taken as the direction standard, the drive circuit 213 is only provided on the right side region of the drive surface. The mounting members 214 for fixedly mounting the metal plate 230 are provided at the left side and right side regions of the drive surface. Three cylinders on the right side of the PCB board 210 in FIG. 5 are the mounting members 214 for fixedly mounting the metal plate 230, and three through-holes are provided on the metal plate 230 corresponding to the three cylinders to match mounting, and the same goes for the left side. Mounting members 214 for fixedly mounting the sub-frame 120 are provided only in the right side region of the drive surface. As shown in FIG. 7, the mounting members 214 pass through the mounting member through-holes 232, which is used for fixedly mounting the entire display module 200 to the sub-frame 120. The second micro-switches 215 are provided on the left side and right side regions of the drive surface, two on each side region, and the switch button thereof is pressed when the metal plate 230 is mounted in place. The second micro-switch 215 can be triggered when the metal plate 230 is pried to release the pressing on the switch button thereof. The third micro-switches 216 are provided on the left side and right side regions of the drive surface, two on each side region. As shown in FIG. 7, the third micro-switch passes through the switch through-hole 231, and the switch button thereof is pressed when the display module 200 is mounted to the sub-frame 120. The third micro-switch 216 can be triggered when the display module 200 is stolen and dismantled and the pressing to the switch button is released. The second micro-switch 215 and the third micro-switch 216 can also both be connected to a safety monitoring circuit or a safety execution circuit. When the second micro-switch 215 is triggered, a safety prompt can be sent out, i.e., information about the detachment of the metal plate 230 from the PCB board 210 is transmitted to the outside. When the third micro-switch 216 is triggered, a safety prompt can be sent out, i.e., information about the detachment of the display module 200 from the sub-frame 120 is transmitted to the outside. Alternatively, when the second micro-switch 215 or the third micro-switch 216 is triggered, a safety action is executed. For example, in an application scenario of a movie screen, the cinema server may interrupt the playing of the movie film when the second micro-switch 215 or the third micro-switch 216 is triggered, to prevent the data information of the movie screen from being stolen and prevent the movie material from being pirated.

In an embodiment of the present disclosure, the mask 220 and the PCB board 210 may be fixed by gluing. By gluing and fixing, it is possible to avoid the arrangement of a screw connector, a clamp connector, a plug connector, etc. on the light-emitting surface and to avoid affecting the display effect.

In an embodiment of the present disclosure, the mounting members 214 used for fixedly mounting the metal plate 230 and fixedly mounting the sub-frame 120 can be a common threaded piece, clamping piece, plug-in piece, etc. In other embodiments of the present disclosure, the mounting between the PCB board 210 and the metal plate 230 and the mounting between the display module 200 and the sub-frame 120 may also be replaced by bonding, in which case the mounting member 214 may refer to a bonding region.

One of the functions of the metal plate 230 provided in the embodiments of the present disclosure is to cover the drive circuit, prevent the drive circuit from being exposed to the outside and prevent signal theft. At the same time, the metal plate 230 can shield electromagnetic signals and maintain electromagnetic compatibility, and is able to prevent a metal object from penetrating into the drive surface through the second sound transmission holes to steal signal, and prevent the film material from being pirated. In order to further improve the effect, in an embodiment of the present disclosure, the mask 220 can be made of an electromagnetic shielding material, and the first sound transmission holes 212 provided on the PCB board 210 are metallized holes.

It should be understood that some elements in the drive circuit 213 of the drive face of the PCB board 210 are relatively bulky and have a significant protrusion with respect to other elements. In an embodiment of the present disclosure, in order not to increase the thickness of the display module 200 and ensure the flatness of the metal plate 230, a receiving space may be further provided at the left side and/or right side region of the metal plate 230 at a position corresponding to the protruding elements in the drive circuit 213. The receiving space may be a countersink or a counterbore into which the raised portion of the component can be received.

In an embodiment of the present disclosure, in consideration of the requirements for vibration damping and sound reduction and insulation, an insulating and vibration-absorbing material, such as an insulating and vibration-absorbing pad made of rubber, may be further filled between the metal plate 230 and the PCB board 210.

In an embodiment of the present disclosure, the cabinet frame 100 may be made of a metal material or embedded in a metal protective housing, which on the one hand can improve the mechanical strength of the display module set as a whole, and on the other hand can improve the heat conduction efficiency and further improve the heat dissipation performance.

In summary, in the display module set of the embodiment of the present disclosure, the hole structure of each display module used for sound transmission is uniform and concentrated, and the display screen formed by splicing same is suitable for placing a speaker at the back, which is suitable for a large-sized display screen and ensures the sound transmission effect of the large-sized display screen. The drive circuit thereof is in direct contact with the frame, which has a good heat dissipation performance. Through the setting of three micro-switches, hardware and video information can be prevented from being stolen. Through the design of the metal plate, the mask with shielding property and the metalized sound transmission holes, electromagnetic interference can be effectively avoided and video information can be effectively prevented from being stolen. By filling the insulating and vibration-absorbing material between the metal plate and the PCB board, the vibration damping and sound reduction effect can be improved and the need for insulation can be satisfied.

Based on the display module set of the above-mentioned embodiments, the present disclosure also provides a display screen.

The display screen of the embodiment of the present disclosure is formed by splicing at least one display module set of the above-mentioned embodiments, which has good sound transmission effect and good heat dissipation performance.

Figure 8:
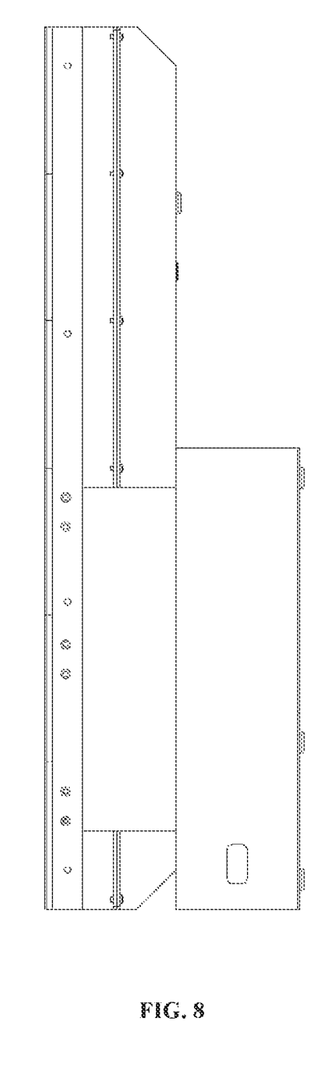
FIG. 8 is a structural diagram of a perspective of a display module set including a cinema server according to an embodiment of the present disclosure.
Figure 9:
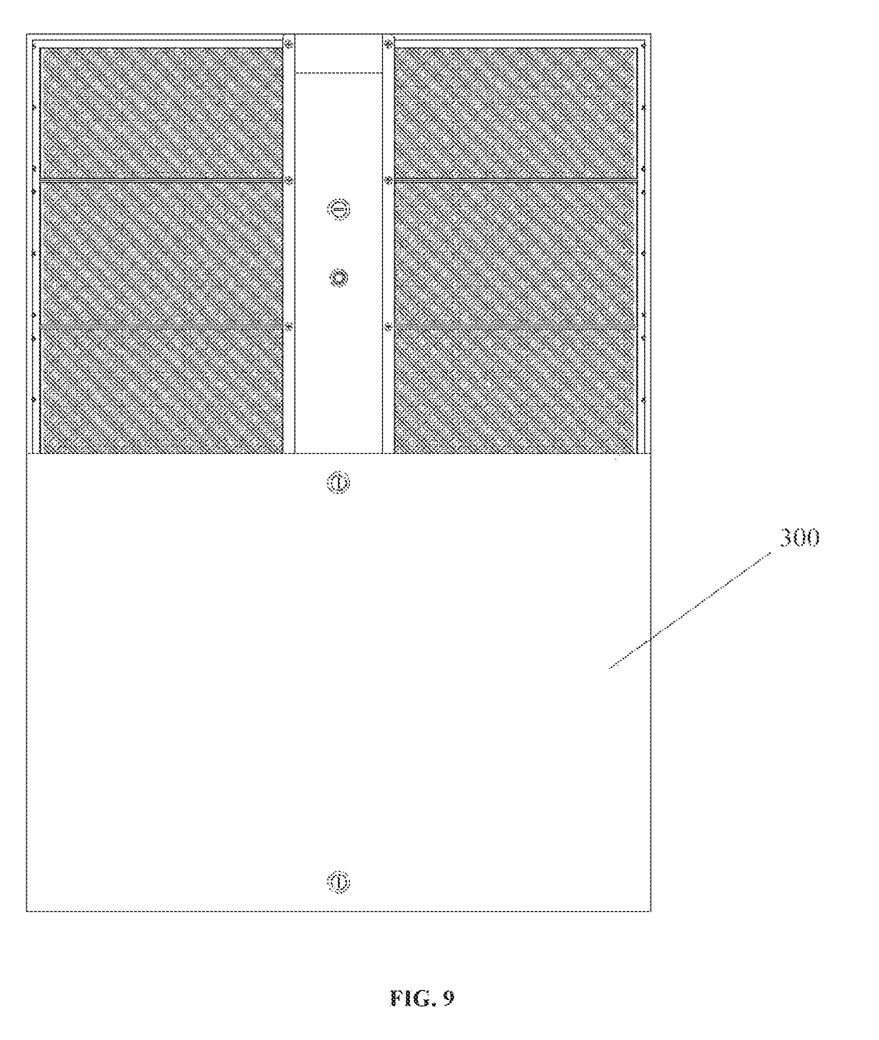
FIG. 9 is a structural diagram of another perspective of a display module set including a cinema server according to an embodiment of the present disclosure.

When the display screen is a movie screen composed of a plurality of display module sets, there must be one display module set for mounting the cinema server. As shown in FIGS. 8 and 9, when the cinema server 300 is mounted in the display module set, a part of the hole structure for sound transmission is blocked, the sound transmission rate of the display module set is lower than that of other display module sets. In order to avoid relatively obvious influence on the sound transmission effect of the movie screen, in an embodiment of the present disclosure, the display module set mounted with the cinema server 300 may be at one corner of the movie screen, for example, the lower left corner or the lower right corner.

In the description of the present disclosure, the terms "first" and "second" etc. are used for descriptive purposes only and are not to be construed as indicating or implying relative importance or implicitly indicating the number of technical features indicated. Thus, a feature defined as "first" or "second" may explicitly or implicitly comprise one or more of the stated features. "A plurality of" refers to two or more unless specifically defined otherwise.

In the present disclosure, unless explicitly stipulated and limited otherwise, the terms "mounted", "coupled", "connected", "fixed" and the like are to be understood in a broad sense. For example, they may be fixedly connected or detachably connected, or integrated. They may be a mechanical connection or an electrical connection. They can be a direct connection or an indirect connection through an intermediate medium, and can be the communication between two elements or the interaction relationship between two elements. The specific meaning of the above terms in the present disclosure can be understood by a person skilled in the art according to specific circumstances.

In the present disclosure, unless expressly specified and limited otherwise, the first feature "on" or "under" the second feature may be that the first and second features are in direct contact, or that the first and second features are in indirect contact through an intermediate medium. Further, the first feature being "on", "above" and "over" the second feature may be directly above or obliquely above the second feature or merely indicate that the first feature is at a higher level than the second feature. The first feature being "under", "below" and "beneath" the second feature may be that the first feature is directly below or obliquely below the second feature, or simply that the first feature has a smaller level than the second feature.

In the description of this specification, reference to the description of the terms "an embodiment", "some embodiments", "an example", "particular examples", or "some examples", etc., means that a particular feature, structure, material, or characteristic described in connection with the embodiment or example is included in at least an embodiment or example of the present disclosure. In this specification, schematic representations of the above terms are not necessarily directed to the same embodiment or example. Furthermore, the particular features, structures, materials, or characteristics described may be combined in any one or more embodiments or examples in a suitable manner. Moreover, various embodiments or examples described in this specification, as well as features of various embodiments or examples, may be integrated and combined by a person skilled in the art without departing from the scope of the disclosure.

Although the embodiments of the present disclosure have been shown and described above, it should be understood that the above-described embodiments are illustrative and are not to be construed as limiting the present disclosure, and that changes, modifications, substitutions and alterations can be made by a person skilled in the art within the scope of the present disclosure.

What is claimed is:

1. A display module set, comprising:
    a cabinet frame, comprising a power box and a plurality of sub-frames located on the left side and the right side of the power box, wherein the sub-frames on each side are arranged sequentially in a vertical direction;
    a plurality of display modules, wherein the plurality of the display modules corresponds to a plurality of the sub-frames on a one-to-one basis, a drive circuit and mounting members of the display module are both provided on a left side and/or right side region, a middle region of the display module is uniformly distributed with a hole structure for sound transmission, and the display module is mounted on a corresponding sub-frame via the mounting members of the left side and/or right side region,
    wherein the power box comprises a body and a rear cover, and an anti-theft lock and a first micro-switch are fitted between the rear cover and the body,
    wherein the display module comprises a PCB board, a mask provided on a light-emitting surface of the PCB board, and a metal plate provided on a drive surface of the PCB board, wherein a second micro-switch and a third micro-switch are provided on a left side and/or right side region of the drive surface of the PCB board,
    wherein the first micro-switch, the second micro-switch, and the third micro-switch are all connected to a safety monitoring circuit or a safety execution circuit,
    wherein the first micro-switch is triggered when the rear cover is pried, the second micro-switch is triggered when the metal plate is pried, the third micro-switch is triggered when the display module is stolen and dismantled, such that a security prompt is issued or a security action is executed to prevent data information from being stolen,
    wherein the mask is made of an electromagnetic shielding material,
    wherein the hole structure for sound transmission comprises first sound transmission holes provided in a middle region of the light-emitting surface of the PCB board, and the first sound transmission holes are metallized holes.

2. The display module set according to claim 1, wherein both an upper side and a lower side of the body are provided with cable holes.

3. The display module set according to claim 1,
    wherein all the light-emitting surface of the PCB board is provided with light-emitting pixels arranged in an array; one first sound transmission hole is provided between every four adjacent light-emitting pixels in the middle region of the light-emitting surface of the PCB board; and the drive circuit for driving the light-emitting pixels, the mounting members for fixedly mounting the metal plate and fixedly mounting the sub-frame are further provided on a left side and/or right side region of the drive surface of the PCB board;
    wherein a switch through-hole is provided in the left side and/or right side region of the metal plate at a position corresponding to the third micro-switch, a mounting member through-holes is provided at a position corresponding to the mounting member for fixedly mounting the sub-frame,
    wherein the hole structure for sound transmission further comprises second sound transmission holes that are provided in a middle region of the metal plate and
    third sound transmission holes that are provided in a middle region of the mask, and the third sound transmission holes provided by the mask correspond to the first sound transmission holes provided by the PCB board.

4. The display module set according to claim 1, wherein the mask is secured to the PCB board by gluing.

5. The display module set according to claim 1, wherein an insulating and vibration-absorbing material is filled between the metal plate and the PCB board.

6. The display module set according to claim 5, wherein a receiving space is further provided at the left side and/or right side region of the metal plate at positions corresponding to the protruding elements of the drive circuit.

7. The display module set according to claim 1, wherein the cabinet frame is metal or embedded in a metal protective housing.

8. A display screen comprising at least one display module set according to claim 1.

9. The display screen according to claim 8, wherein when the display screen is a movie screen formed by splicing a plurality of the display module sets, one of the display module sets is mounted with a cinema server, and the display module set mounted with the cinema server is provided at a corner of the movie screen.

* * * * *